United States Patent [19]

Okusawa

[11] Patent Number: 5,718,747
[45] Date of Patent: Feb. 17, 1998

[54] EMULSION INK FOR STENCIL PRINTING

[75] Inventor: Koichi Okusawa, Inashiki-gun, Japan

[73] Assignee: Riso Kagaku Corporation, Tokyo, Japan

[21] Appl. No.: 759,631

[22] Filed: Dec. 5, 1996

[30] Foreign Application Priority Data

Dec. 5, 1995 [JP] Japan ................. 7-339888

[51] Int. Cl.$^6$ ................. C09D 11/02
[52] U.S. Cl. ................. 106/31.26; 106/319
[58] Field of Search ............ 106/20 R, 30 R, 106/27 R, 27 A

[56] References Cited

U.S. PATENT DOCUMENTS

| | | | |
|---|---|---|---|
| 5,389,130 | 2/1995 | Batlaw et al. | 106/30 R |
| 5,395,435 | 3/1995 | Mizobunchi | 106/29 R |
| 5,573,578 | 11/1996 | Okuda | 106/30 R |
| 5,609,670 | 3/1997 | Okuda et al. | 106/28 R |

FOREIGN PATENT DOCUMENTS 834 311  5/1960  United Kingdom .

OTHER PUBLICATIONS

Patent Abstracts of Japan, vol. 017, No. 478 (C–1104), JP-A-05-117565 A, 31 Aug. 1993.
Patent Abstracts of Japan, vol. 95, No. 007, JP-A-07-179799 (18 Jul. 1995).

*Primary Examiner*—Helene Klemanski
*Attorney, Agent, or Firm*—Cushman Darby & Cushman IP Group of Pillsbury Madison & Sutro, LLP

[57] ABSTRACT

A water-in-oil (w/o) emulsion ink for stencil printing, which contains carbon black having a pH of 5 or lower, preferably 3.5 or lower as a colorant added to the oil phase, in an amount of 2–10 % by weight based on the total weight of the ink, is provided. The emulsion ink is improved in phase separation in course of time and stabilized while printability is kept well.

2 Claims, No Drawings

EMULSION INK FOR STENCIL PRINTING

The present invention relates to a water-in-oil (w/o) emulsion ink for stencil printing, and more particularly relates to an emulsion ink excellent in storage stability.

Conventional water-in-oil (w/o) emulsion inks for stencil printing often undergo separation into oil phase and water phase in course of time due to creaming, aggregation and integration of water droplets, which are effected by heat or temperature changes, vibration, centrifugation and the like. Therefore, they are not so satisfactory in storage stability as to stably provide desired prints.

As a method for improving water-in-oil (w/o) emulsion inks in storage stability, there has been known appropriately selecting an emulsifier and increasing its addition amount. However, this method has its limit for maintaining emulsion inks in stable condition over a desired shelf life.

In order to improve storage stability, it is also possible to increase the amount of pigments that are added as colorants to inks. However, the addition amount of pigments has to be limited to keep good printability, and thus it is difficult to satisfy both storage stability and printability.

It is an object of the present invention to provide a water-in-oil (w/o) emulsion ink containing carbon black as a colorant in the oil phase thereof, which is improved in storage stability while maintaining good printability.

As a result of intensive researches for the above object, the present inventor has found that pH value of carbon black which is added as a colorant to the oil phase of a water-in-oil emulsion ink for stencil printing has an effect on storage stability of the emulsion ink, and thus has completed the present invention.

That is, the present invention provides a water-in-oil (w/o) emulsion ink for stencil printing, which contains carbon black as a colorant in the oil phase thereof, said carbon black having a pH value of 5 or lower, preferably 3.5 or lower, and the content of said carbon black being 2–10% by weight based on the total weight of the ink.

In general, carbon black possesses on the surface thereof acid radicals derived from oxides that have been attached to the surface of carbon black during its manufacturing processes. The pH value of carbon black is dependent upon the amount of said acid radicals. The lower the pH value is, the more the amount of the attached oxides is, and the greater the polarity of carbon black is. When pH value of carbon black added to the oil phase is 5 or lower, the carbon black tends to gather at the interface between the oil phase and the water phase due to its polarity while the two phases are balanced in accordance with the Bancroft's law, and thus the phase boundary is strengthen to stabilize the emulsion. Conversely, when carbon black having a pH value of more than 5 is added to the oil phase, it dose not seem to gather at the interface due to weak polarity, and thus the phase boundary is not strengthen and no improvement is seen in storage stability of the emulsion.

In the present invention, carbon black may be furnace carbon black, lampblack, acetylene black, channel black and the like. The pH value of carbon black is measured in accordance with JIS (Japanese Industrial Standards) Z8802 in which carbon black is added to water, the mixture is thoroughly stirred at room temperature, and then pH value of the water is measured.

In the present invention, addition amount of carbon black is preferably 2–10% by weight based on the total weight of the ink. When it is less than 2 % by weight, effect of improving inks in storage stability is poor. When it is more than 10% by weight, printed image is blurred, or inks are not sufficiently transferred to printing paper.

The present w/o emulsion ink for stencil printing can usually comprise about 10–70% by weight of oil phase and about 90–30% by weight of water phase. As is known, the oil phase usually comprises solvents, colorants, resins, emulsifiers and the like, and the water phase comprises water and additives such as wetting agents, electrolytes, antifungal agents, antioxidants, water-evaporation inhibiting agents, antifreezing agents and water-soluble agents.

As solvents, may be used mineral oils such as liquid paraffin, motor oil, spindle oil, gas oil, kerosine, machine oil and lubricating oil, vegetable oils such as olive oil, rapeseed oil, castor oil, jojoba oil, sunflower oil, safflower oil, soybean oil, corn oil, linseed oil and tall oil, esters such as tricresyl phosphate (TCP) and dioctyl phthalate (DOP), and other synthetic oils.

As resins, may be used alkyd resin, rosin-modified alkyd resin, phenol resin, rosin-modified phenol resin, maleic resin, rosin-modified maleic resin, rosin, polymerized rosin, hydrogenated rosin, rosin ester, hydrogenated rosin ester, petroleum resin, polymerized castor oil, terpene resin, rubber-derivative resin, and the like.

As colorants, may be added colorants other than the above mentioned carbon black as required.

As emulsifiers, may be used fatty acid monoglyceride, fatty acid diglyceride, polyoxyethylene higher fatty acid ester, sorbitan higher fatty acid ester, polyoxyethylene castor oil, hardened castor oil, and ethylene oxide adducts of higher alcohols, alkylphenols, fatty acids or the like. They may be used alone or in combination of two or more, for example, one higher in HLB (hydrophile-lypophile balance) and another lower in HLB.

The present water-in-oil (w/o) emulsion ink can readily be prepared by, for example, adding said water phase to said oil phase and agitating them to emulsify.

EXAMPLES

Hereinafter, the present invention will be explained in more detail byway of examples. However, it should be construed that the present invention is not limited to these examples. Meanwhile, the term "part(s)" means "part(s) by weight" in the following examples.

Example 1

Oil phase was prepared by mixing the following carbon black, resin, solvent and emulsifier at the following proportion, stirring the mixture, and then kneading it with a roll mill having three rollers. Then, water phase composed of ion-exchanged water containing ethylene glycol as an antifreezing agent was gradually added to the oil phase under agitation to obtain an emulsified product.

| | |
|---|---|
| Carbon black (pH value = 3.5) | 5.0 parts |
| Alkyd resin | 9.0 parts |
| Motor oil | 13.0 parts |
| Sorbitan monooleate | 3.0 parts |
| Ethylene glycol | 4.0 parts |
| Ion-exchanged water | 66.0 parts |
| Total | 100.0 parts |

Example 2

An emulsified product was obtained as in the same manner as in Example 1, except that the following components were used.

| Carbon black (pH value = 2.0) | 2.0 parts |
|---|---|
| Alkyd resin | 10.0 parts |
| Motor oil | 13.0 parts |
| Sorbitan monooleate | 3.0 parts |
| Ethylene glycol | 4.0 parts |
| Ion-exchanged water | 68.0 parts |
| Total | 100.0 parts |

Example 3

An emulsified product was obtained as in the same manner as in Example 1, except that the following components were used.

| Carbon black (pH value = 2.0) | 10.0 parts |
|---|---|
| Alkyd resin | 8.0 parts |
| Motor oil | 12.0 parts |
| Sorbitan monooleate | 3.0 parts |
| Ethylene glycol | 4.0 parts |
| Ion-exchanged water | 63.0 parts |
| Total | 100.0 parts |

Example 4

An emulsified product was obtained as in the same manner as in Example 1, except that the following components were used.

| Carbon black (pH value = 5.0) | 2.0 parts |
|---|---|
| Alkyd resin | 10.0 parts |
| Motor oil | 13.0 parts |
| Sorbitan monooleate | 3.0 parts |
| Ethylene glycol | 4.0 parts |
| Ion-exchanged water | 68.0 parts |
| Total | 100.0 parts |

Example 5

An emulsified product was obtained as in the same manner as in Example 1, except that the following components were used.

| Carbon black (pH value = 5.0) | 10.0 parts |
|---|---|
| Alkyd resin | 8.0 parts |
| Motor oil | 12.0 parts |
| Sorbitan monooleate | 3.0 parts |
| Ethylene glycol | 4.0 parts |
| Ion-exchanged water | 63.0 parts |
| Total | 100.0 parts |

Comparative Example 1

An emulsified product was obtained as in the same manner as in Example 1, except that the following components were used.

| Carbon black (pH value = 2.0) | 1.0 parts |
|---|---|
| Alkyd resin | 11.0 parts |
| Motor oil | 13.0 parts |
| Sorbitan monooleate | 3.0 parts |
| Ethylene glycol | 4.0 parts |
| Ion-exchanged water | 68.0 parts |
| Total | 100.0 parts |

Comparative Example 2

An emulsified product was obtained as in the same manner as in Example 1, except that the following components were used.

| Carbon black (pH value = 5.0) | 12.0 parts |
|---|---|
| Alkyd resin | 7.0 parts |
| Motor oil | 11.0 parts |
| Sorbitan monooleate | 3.0 parts |
| Ethylene glycol | 4.0 parts |
| Ion-exchanged water | 68.0 parts |
| Total | 100.0 parts |

Comparative Example 3

An emulsified product was obtained as in the same manner as in Example 1, except that the following components were used.

| Carbon black (pH value = 7.2) | 2.0 parts |
|---|---|
| Alkyd resin | 10.0 parts |
| Motor oil | 13.0 parts |
| Sorbitan monooleate | 3.0 parts |
| Ethylene glycol | 4.0 parts |
| Ion-exchanged water | 68.0 parts |
| Total | 100.0 parts |

Comparative Example 4

An emulsified product was obtained as in the same manner as in Example 1, except that the following components were used.

| Carbon black (pH value = 7.2) | 10.0 parts |
|---|---|
| Alkyd resin | 8.0 parts |
| Motor oil | 12.0 parts |
| Sorbitan monooleate | 3.0 parts |
| Ethylene glycol | 4.0 parts |
| Ion-exchanged water | 63.0 parts |
| Total | 100.0 parts |

The inks, namely the emulsified products obtained in the above Examples and Comparative Examples were each subjected to a test comprising a two-day cycle of successive temperature changes from 25° C., −20° C., 50° C. to 25 ° C. After ten cycles, the inks were observed. Also, stencil printing was effected with a stencil printing machine "RISOGRAPH RC-115" manufactured by RISO KAGAKU CORPORATION using each of the inks, and then printed image was evaluated for each ink. The results are shown in Table 1.

TABLE 1

|  | pH value of carbon black | Addition amount of carbon black in ink(wt. %) | Storage stability | Printability |
| --- | --- | --- | --- | --- |
| Example 1 | 3.5 | 5.0 | +++ | +++ |
| Example 2 | 2.0 | 2.0 | +++ | ++ |
| Example 3 | 2.0 | 10.0 | +++ | ++ |
| Example 4 | 5.0 | 2.0 | ++ | ++ |
| Example 5 | 5.0 | 10.0 | ++ | ++ |
| Comparative Example 1 | 2.0 | 1.0 | + | + |
| Comparative Example 2 | 5.0 | 12.0 | ++ | − |
| Comparative Example 3 | 7.2 | 2.0 | − | ++ |
| Comparative Example 4 | 7.2 | 10.0 | + | ++ |

Evaluation of storage stability
+++: No emulsion destruction occurred for a long time, and no softening phenomenon occurred.
++: No emulsion destruction occurred, and no softening phenomenon occurred.
+: No emulsion destruction occurred, but softening phenomenon occurred.
−: Emulsion destruction occurred.
Evaluation of printability
+++: No spreading nor blurring occurred, and printing density was very high.
++: No spreading nor blurring occurred, and printing density was high.
+: No spreading nor blurring occurred, but printing density was low.
−: Blurring occurred on printed image, and ink were unevenly transferred.

From Table 1, it is found that when carbon black having a pH of 5.0 or lower, particularly 3.5 or lower is used as a colorant added to the oil phase of water-in-oil emulsion inks in an amount of 2–10% by weight of the ink, emulsion inks excellent in both storage stability and stencil-printability can be obtained.

According to the present invention, a w/o emulsion ink for stencil printing can be improved in phase separation in course of time and stabilized, and can keep its printability well, by employing carbon black having a pH value of 5 or lower in an amount of 2–10% by weight of the ink, as a colorant contained in the oil phase.

I claim:
1. A water-in-oil emulsion ink for stencil printing, which contains carbon black having a pH of 5 or lower as a colorant added to the oil phase, in an amount of 2–10% by weight based on the total weight of the ink.
2. A water-in-oil emulsion ink defined in claim 1, in which said carbon black has a pH of 3.5 or lower.

* * * * *